Parsons & Wooster.
Shovel.
N° 66,169.   Patented Jan. 25, 1867.
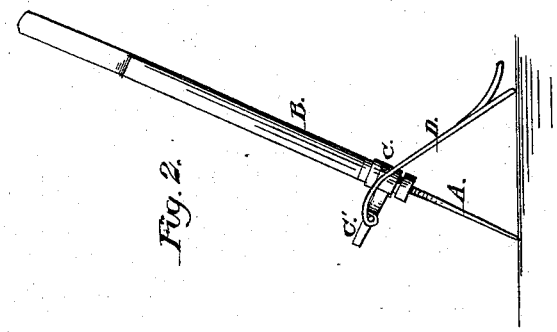
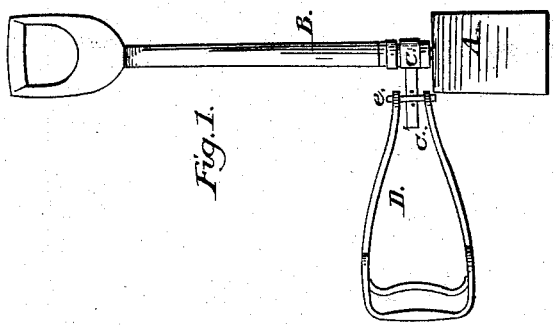

United States Patent Office.

H. W. PARSONS AND L. L. WOOSTER, OF WHITNEY'S POINT, NEW YORK.

Letters Patent No. 66,169, dated June 25, 1867.

ATTACHMENT FOR SPADING-FORKS AND SHOVELS.

*The Schedule referred to in these Letters Patent and making part of the same.*

TO ALL WHOM IT MAY CONCERN:

Be it known that we, H. W. PARSONS and L. L. WOOSTER, of Whitney's Point, in the county of Broome, and in the State of New York, have invented certain new and useful improvements in Attachments for Spading-Forks and Shovels; and do hereby declare that the following is a full, clear, and exact description thereof, reference being had to the accompanying drawings, and to the letters of reference marked thereon.

In the annexed drawings, A represents a spade or shovel, which is made in any of the known and usual ways, and provided with the usual handle B. Near the spade, and surrounding the handle, is a collar, C, with a pin, C', connected to or forming a part of it. The pin C' passes through an opening in the centre of a small bar, e. D represents a metallic loop or link divided, as seen, at one end, and having eyes formed in it at the other, into which pass the ends of the bar e. These eyes act as bearings for the ends of the bar.

In using this implement, the spade is passed through the loop, the loop and spade being in the position seen in Figure 2, with the lower and forked or divided end resting upon the ground. The spade is thrust into the earth the depth it is designed to go; then the operator bears down the upper end of the handle, using the lever as a fulcrum, raising the earth upon the spade above the ground. He then partially revolves the handle, which turns in the collar C, depositing the earth which it has raised. This operation is continued, using at each time the loop as a fulcrum for the spade.

It will readily be perceived that by this arrangement the operator is relieved from the task of raising by main strength, at each thrust of the spade, the earth which the spade cuts loose and is designed to carry up.

This loop may be attached in like manner to spading-forks, and operated in a similar manner.

Having thus fully described our invention, what we claim as new, and desire to secure by Letters Patent, is—

The loop D and the pin and collar C, with the spade or fork, as and for the purpose specified.

In testimony that we claim the foregoing we have hereunto set my hands this 29th day of April, 1867.

H. W. PARSONS,
L. L. WOOSTER.

Witnesses:
  J. P. ADAMS,
  A. W. MARR.